US007565021B2

(12) United States Patent
Feng et al.

(10) Patent No.: US 7,565,021 B2
(45) Date of Patent: Jul. 21, 2009

(54) EFFICIENT IMPLEMENTATION OF BLOCK-BASED TRANSFORM ON GRAPHICS PROCESSING UNIT

(75) Inventors: Bo Feng, Hangzhou (CN); Guo Bin Shen, Haidian District (CN); Shipeng Li, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 484 days.

(21) Appl. No.: 11/069,726

(22) Filed: Mar. 1, 2005

(65) Prior Publication Data

US 2006/0204119 A1    Sep. 14, 2006

(51) Int. Cl.
*G06K 9/46* (2006.01)
(52) U.S. Cl. .................... 382/239; 382/232; 382/233; 382/240; 382/250; 382/251; 375/240.24; 375/240.25
(58) Field of Classification Search .............. 382/232, 382/233, 239, 240, 245, 246, 250, 251, 253; 345/418, 419, 582, 603, 619; 375/240.2, 375/240.24, 240.25, 240.18
See application file for complete search history.

(56) References Cited

U.S. PATENT DOCUMENTS

| 6,573,905 | B1 * | 6/2003 | MacInnis et al. ............. 345/629 |
| 6,963,613 | B2 * | 11/2005 | MacInnis et al. ........ 375/240.25 |
| 7,096,245 | B2 * | 8/2006 | Hsiun et al. .................. 708/401 |
| 2004/0117418 | A1 * | 6/2004 | Vainsencher et al. ......... 708/402 |
| 2004/0150647 | A1 * | 8/2004 | Aleksic et al. ............... 345/555 |
| 2005/0129321 | A1 * | 6/2005 | Yamaguchi et al. .......... 382/239 |
| 2005/0219252 | A1 * | 10/2005 | Buxton et al. ................ 345/542 |

OTHER PUBLICATIONS http://www.apple.com/macosx/tiger/coreimage.html.
Buck, Ian, et al., "Brook for GPUs: Stream Computing on Graphics Hardware," SIGGRAPH 2004, Stanford University, 11 pages.
Hall, Jesse D., et al., "Cache and Bandwidth Aware Matrix Multiplication on the GPU," University of Illinois, Tech Report UIUCDCS-R-2003-2328, 2003, 6 pages.
Krüger, Jens, et al., "Linear Algebra Operators for GPU Implementation of Numerical Algorithms," Computer Graphics and Visualization Group, Technical University Munich, SIGGRAPH 2003, 9 pages.
Bajaj, Chandrajit, et al., "SIMD Optimization of Linear Expressions for Programmable Graphics Hardware," The Eurographics Association and Blackwell Publishers, vol. 23, No. 4, 2004, 18 pages.
Fatahalian, K., et al., "Understanding the Efficiency of GPU Algorithms for Matrix-Matrix Multiplication," Graphics Hardware, 2004, 5 pages.
Arman, Farshid, et al., "Image Processing On Compressed Data For Large Video Databases," *Proceedings of the first ACM International Conference on Multimedia*, Sep. 1993, pp. 1-6.

(Continued)

*Primary Examiner*—Matthew C Bella
*Assistant Examiner*—Ali Bayat
(74) *Attorney, Agent, or Firm*—Woodcock Washburn LLP (57) ABSTRACT

Implementations of transforms, such as a discrete cosine transform (DCT) and inverse DCT on a graphics processing unit (GPU), use direct matrix multiplication. GPU features such as parallel graphics pipelines, multi-channel capability, and multiple render targets are used to obtain significantly faster processing speeds than on a conventional central processing unit (CPU). Various rendering modes may be used, such as point rendering mode, line rendering mode, and triangle or quadrilateral rendering mode.

17 Claims, 8 Drawing Sheets

OTHER PUBLICATIONS

Kalavade, Asawaree, et al., "Hardware/Software Partitioning for Multi-function Systems," *IEEE*, 1997, pp. 516-521.

Rosa, Gabriel G., et al., "An Interactive Volume Visualization System for Transient Flow Analysis," *Proceedings of the 2003 Eurographics/IEEE TVCG Workshop on Volume graphics*, Jul. 2003, pp. 137-144.

Saha, Subhasis, "Image Compression—from DCT to Wavelets: A Review," http://www.acm.org/crossroads/xrds6-3/sahaimgcoding.html, 2000, 25 pages.

Shen, Guobin, et al., "Accelerating Video Decoding Using GPU," *IEEE*, 2003, pp. IV-772-IV-775.

Shi, Changgui, et al., "A Fast MPEG Video Encryption Algorithm," *Proceedings of the sixth ACM international conference on Multimedia*, Sep. 1993, pp. 81-88.

Sijstermans, Frans, et al. "CD-I Full-Motion Video Encoding on a Parallel Computer," *Communications of the ACM*, Apr. 1991, vol. 34, Issue 4, pp. 82-91.

Sloan, Peter-Pike, et al., "Clustered Principal Components for Precomputed Radiance Transfer," *ACM Transactions on Graphics (TOG)*, Jul. 2003, vol. 22, Issue 3, pp. 382-391.

* cited by examiner

EFFICIENT IMPLEMENTATION OF BLOCK-BASED TRANSFORM ON GRAPHICS PROCESSING UNIT

FIELD OF THE INVENTION

This invention relates in general to the field of computer processing. More particularly, this invention relates to the use of a graphics processing unit to accelerate graphics and non-graphics operations.

BACKGROUND OF THE INVENTION

For still image compression, the Joint Photographic Experts Group (JPEG) standard has been established by ISO (International Standards Organization) and IEC (International Electro-Technical Commission). The performance of coders in accordance with this standard generally degrades at low bit-rates mainly because of the underlying block-based Discrete Cosine Transform (DCT) scheme.

Figure 1:
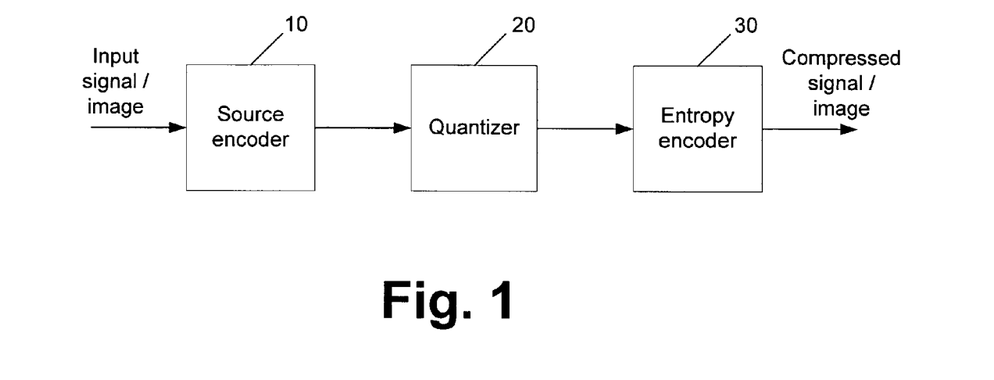
FIG. 1 is a block diagram of a typical lossy image compression.

A typical lossy image compression system (lossy signal/image encoder) is shown in FIG. 1 and comprises a source encoder 10, a quantizer 20, and an entropy encoder 30. Compression is accomplished by applying a linear transform to decorrelate the image data, quantizing the resulting transform coefficients, and entropy coding the quantized values.

For the source encoder 10, a variety of linear transforms have been developed which include the Discrete Fourier Transform (DFT), Discrete Cosine Transform (DCT), and Discrete Wavelet Transform (DWT), for example.

The quantizer 20 reduces the number of bits needed to store the transformed coefficients by reducing the precision of those values. Because this is a many-to-one mapping, it is a lossy process and is the main source of compression in an encoder. Quantization can be performed on each individual coefficient, which is known as scalar quantization. Quantization can also be performed on a group of coefficients together, and is known as vector quantization. Both uniform and non-uniform quantizers can be used depending on the particular problem.

The entropy encoder 30 further compresses the quantized values losslessly to give better overall compression. It uses a model to accurately determine the probabilities for each quantized value and produces an appropriate code based on these probabilities so that the resultant output code stream will be smaller than the input stream. The most commonly used entropy encoders are the Huffman encoder and the arithmetic encoder, although for applications requiring fast execution, simple run-length encoding (RLE) has been used.

The idea of compressing an image is not new. The discovery of DCT in 1974 is an important achievement for the research community working on image compression. The DCT can be regarded as a discrete-time version of the Fourier-Cosine series. It is a close relative of DFT, a technique for converting a signal into elementary frequency components. Thus DCT can be computed with a Fast Fourier Transform (FFT) like algorithm in O(n log n) operations. Unlike DFT, DCT is real-valued and provides a better approximation of a signal with fewer coefficients.

Figure 2:
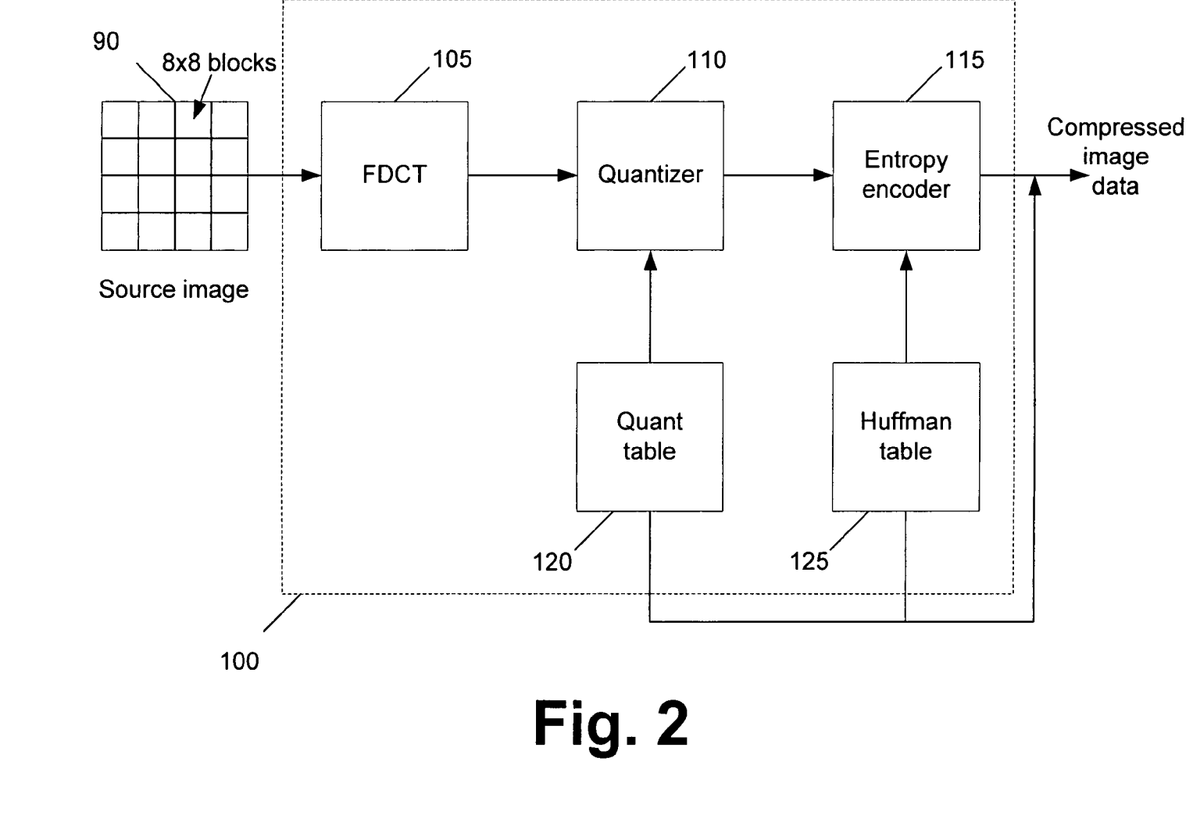
FIG. 2 is a block diagram of a conventional DCT-based encoder.
Figure 3:
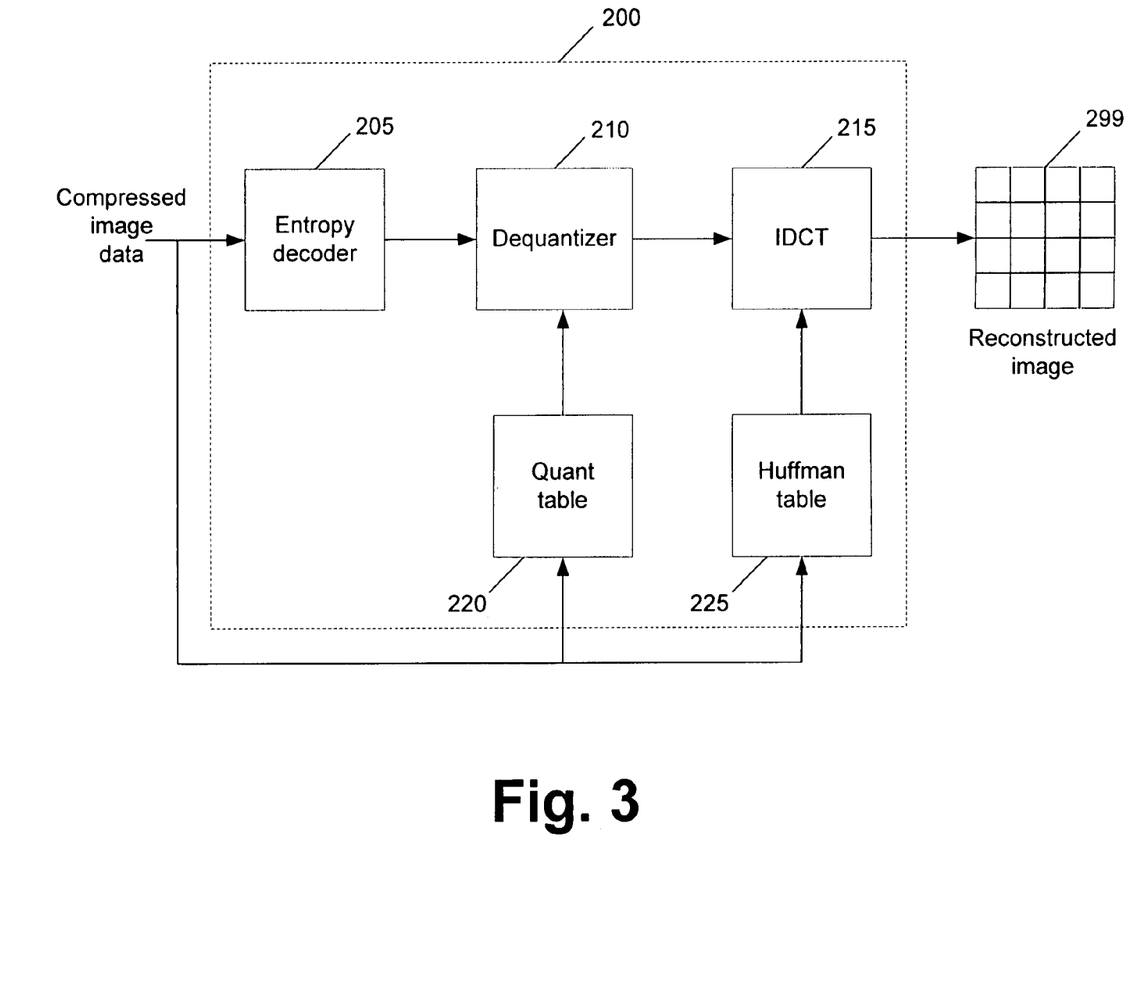
FIG. 3 is a block diagram of a conventional DCT-based decoder.

FIGS. 2 and 3 show in more detail the components in a typical DCT-based encoder and decoder, respectively, for grayscale images. Color image compression can be approximately regarded as compression of multiple grayscale images, which are either compressed entirely one at a time, or are compressed by alternately interleaving 8×8 sample blocks from each in turn.

The DCT-based encoder 100 shown in FIG. 2 can be thought of as compressing a stream of 8×8 blocks of image samples 90. Each 8×8 block makes its way through each processing step/component, and yields output in compressed form into the data stream. The 8×8 blocks are provided to a forward DCT (FDCT) processor 105. Because adjacent image pixels are highly correlated, the FDCT processing lays the foundation for achieving data compression by concentrating most of the signal in the lower spatial frequencies. The sample is then passed to a quantizer 110 (similar to the quantizer 20 in FIG. 1), which uses a quantizer table 120. The results of the quantizer 110 are provided to an entropy encoder 115 (similar to the entropy encoder 30 in FIG. 1) which, in conjunction with a Huffman table 125, provides the output of compressed image data.

For a typical 8×8 sample block from a typical source image, most of the spatial frequencies have zero or near-zero amplitude and need not be encoded. In principle, the DCT introduces no loss to the source image samples; it merely transforms them to a domain in which they can be more efficiently encoded.

The decoder 200 of FIG. 3 performs the opposite functions of those of the encoder 100 of FIG. 2. The compressed image data is provided to an entropy decoder 205, which provides its output to a dequantizer 210 and then to an inverse DCT (IDCT) processor 215. A quantizer table 220 and a Huffman table 225 are also used in the reconstruction of the image 299.

Current computer systems are being designed with increasingly sophisticated graphics systems. These systems often have extremely powerful programmable graphics processing units (GPU) to perform sophisticated graphics functions. Currently, however, certain commonly used image/video coding and processing primitives are not well suited to implementation GPUs. One such function is the DCT and its inverse, which still run in the central processing unit (CPU). The DCT is a very expensive operation. Moreover, when real-time multimedia applications are implemented on a general purpose computer, the CPU is usually heavily loaded and in many cases the CPU alone cannot meet the real-time requirement. Oftentimes, the GPU is idle while the CPU is heavily loaded. It would be desirable to take advantage of the GPU's power in certain situations and applications.

The DCT and inverse DCT are operations that are used to separate an image into spectral sub-bands of differing importance with respect to the image's visual quality. It would be desirable to implement the DCT and inverse DCT on a GPU and make use of various GPU features such as parallel graphics pipelines, multi-channel capability, and multiple render targets to obtain significantly faster processing speeds than on a conventional CPU.

In view of the foregoing, there is a need for systems and methods that overcome the limitations and drawbacks of the prior art.

SUMMARY OF THE INVENTION

The present invention is directed to implementations of transforms, such as a discrete cosine transform (DCT) and inverse DCT on a graphics processing unit (GPU), using direct matrix multiplication. Aspects of the invention make use of GPU features such as parallel graphics pipelines, multi-channel capability, and multiple render targets to obtain significantly faster processing speeds than on a conventional central processing unit (CPU). Various rendering modes may be used, such as point rendering mode, line rendering mode, and triangle or quadrilateral rendering mode.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF PREFERRED EMBODIMENTS

Figure 4:
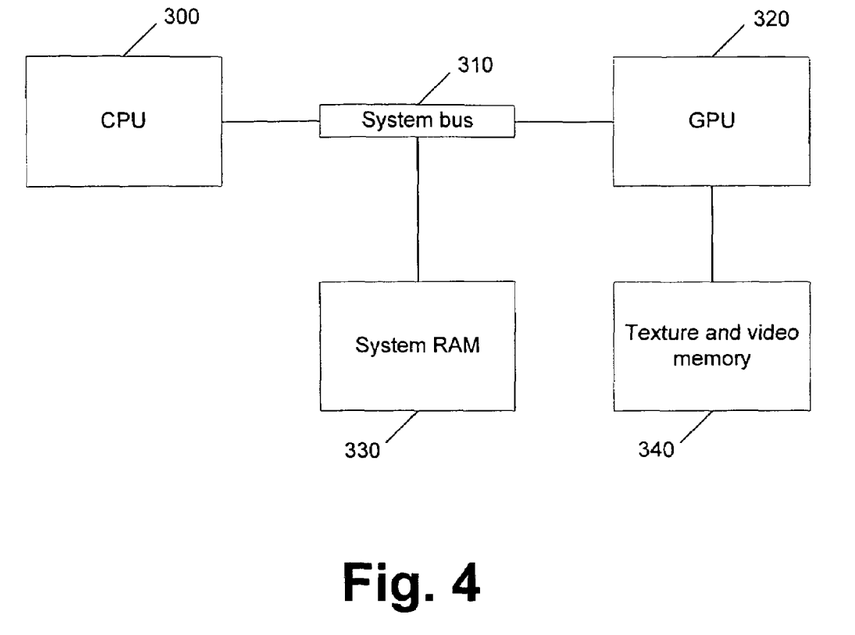
FIG. 4 is a block diagram of an exemplary CPU/GPU system in accordance with the present invention.

FIG. 4 is a block diagram of an exemplary system that may be used in accordance with the present invention in which the DCT is mapped to the GPU 320 instead of the CPU 300. A system bus 310 with system RAM 330 resides between the CPU 300 and the GPU 320. The system bus 310 may be implemented or embedded in a set of chips, for example. The chipset preferably supports the system bus internally or exposes it externally. PCI and AGP are examples of buses that may be used in accordance with the present invention to connect the GPU 320 to the chipset, and therefore to the CPU 300. The GPU 320 has associated texture and video memory 340. The processing involving the DCT, set forth below, takes place within the GPU 320.

According to an exemplary embodiment, an image or picture is broken into 8×8 blocks of pixels. Each block of pixels (in an 8×8 block) is then run through the DCT process, as set forth below, on the GPU 320.

The examples described herein are directed to the DCT and its inverse (IDCT), though the invention is not limited thereto, and instead is applicable in general to block-based transforms, such as one dimensional or two dimensional or even higher dimensional. In other words, aspects of the invention can be applied to any transform that can be expressed via matrix multiplication, such as the Fourier transform, discrete sine transform, integer transform, Hadamard transform, etc.

Moreover, the invention does not depend on any GPU programming language. For example, the shader (code for GPU) can be written in assembly code of a GPU, or can be written with Microsoft High Level Shader Language (HLSL) or the cg language from nVidia, for example. The invention does not depend any particular API, although, for example, both the APIs from Microsoft DirectX and OpenGL can be used. In some exemplary embodiments of the invention, HLSL and Microsoft DirectX APIs may be used.

A one dimensional DCT transform (1D-DCT) can be expressed as:

$$X[k] = \alpha[k] \sum_{n=0}^{N-1} x[n] \cos\left(\frac{\pi(2n+1)k}{2N}\right), \text{ for } k = 0, 1, \ldots, N-1$$

where the input sequence x[n] and output sequence X[k] are both of N-points. The one dimensional IDCT transform (1D-IDCT) can be expressed as:

$$x[n] = \sum_{n=0}^{N-1} \alpha[k] X[k] \cos\left(\frac{\pi(2n+1)k}{2N}\right), \text{ for } n = 0, 1, \ldots, N-1$$

For these equations, $$\alpha[k] = \begin{cases} \sqrt{1/N} & \text{for } k = 0 \\ \sqrt{2/N} & \text{for } k = 1, 2, \ldots, N-1 \end{cases}$$

The transforms (1D-DCT and 1D-IDCT) can be manipulated into matrix format, and vector multiplication can be performed. Given an N×N transform matrix (i.e., a transform kernel) C, and an N-point input vector x, the DCT and IDCT may be defined by the following pair of operations where $X_c$ is the resulting transformed DCT coefficients: $X_c = C \cdot x$, and $x = C^T \cdot X_c$, where $C^T$ is a transpose of matrix C.

A two dimensional DCT transform (2D-DCT) can be expressed as:

$$X[k_1, k_2] = \alpha[k_1]\alpha[k_2] \sum_{n_1=0}^{N_1-1} \sum_{n_2=0}^{N_2-1} x[n_1, n_2] \cos\left(\frac{\pi(2n_1+1)k_1}{2N_1}\right) \cos\left(\frac{\pi(2n_2+1)k_2}{2N_2}\right)$$

for $k_1 = 0, 1, \ldots, N_1-1$ and $k_2 = 0, 1, \ldots, N_2-1$.

$$x[n_1, n_2] = \sum_{k_1=0}^{N_1-1} \sum_{k_2=0}^{N_2-1} \alpha[k_1]\alpha[k_2] X[k_1, k_2] \cos\left(\frac{\pi(2n_1+1)k_1}{2N_1}\right) \cos\left(\frac{\pi(2n_2+1)k_2}{2N_2}\right)$$

for $n_1 = 0, 1, \ldots, N_1-1$ and $n_2 = 0, 1, \ldots, N_2-1$.

The 2D-DCT may be determined using a sequence of row and column 1D transformations (the transform is separable) using a row-column decomposition technique. Thus, the analysis and synthesis equations may be compactly written as $$X_c = C \cdot X \cdot C^T,$$

and $$X = C^T \cdot X_c \cdot C.$$

where X is an image and $X_c$ is the 2D-DCT transform of X and $C^T$ is a transpose of matrix C.

Note that $X_c = C \cdot X \cdot C^T$ can be rewritten as $X_c = (C \cdot (C \cdot X)^T)^T$. This implies that the 2D transform can be obtained by applying a 1D transform twice with a transposition of the resulting intermediate coefficient matrix. Similarly, the inverse transform can be obtained using $X = (C \cdot (C^T \cdot X_c)^T)^T$.

The following examples begin with a 1D transform. Note that the DCT/IDCT transform kernel has the property that the transform matrix of the column transform is a transposed version of that of the row transform. The present invention can be applied to a more general transform case that can be expressed as $X_c = A \cdot X \cdot B$ where A and B are the transform kernels for a column and row transform, respectively. For symbol consistency, use $X_c = C \cdot X$ for a 1D column transform (i.e., the transform is performed along each column of input image block X). Correspondingly, use $X_c = X \cdot C$ for a 1D row transform (i.e., the transform is performed along each row of input image block X). It is helpful to refer to a column transform as left matrix multiplication (LeftX) and a row transform as right matrix multiplication (RightX).

A 2D transform can be achieved either by LeftX first and then RightX on the intermediate result, or by RightX first and then LeftX on the intermediate result. Without loss of generality, assume a 2D transform is obtained by performing RightX first and followed by LeftX. Should the techniques be applied to 1D transform, either LeftX or RightX can be used. Differentiation between the LeftX and the RightX is useful in that the coefficient matrix can be pre-calculated or pro-stored, and stored into constant registers of GPU. If the coefficient matrix is also treated as a texture (as described further herein), then there is desirably no distinction between the two.

It is desirable to use fast algorithms or techniques instead of direct matrix multiplication for implementing a DCT/IDCT on a GPU. On the other hand, a GPU is generally considered a stream processor and its internal processing engine is highly pipelined. As a result, the programming model of GPUs may be somewhat limited, mainly due to the lack of random access writes. Moreover, each pixel (and correspondingly the internal graphics engine) can have only up to four channels, for example, which implies at most four coefficients can be determined a time. With a GPU, the cost of addition, multiplication, multiplication and addition (MAD) and dot product of up to 4-element vectors (dp4) is the same. Moreover, the GPU is intrinsically a SIMD (single instruction, multiple data) machine and the spatial data parallelism can be efficiently exploited. Based on these factors, it is desirable to implement the DCT/IDCT via direct matrix multiplication.

The computation on a GPU is desirably performed using one or more rendering passes. The working flow of a rendering pass can be divided into two stages. In the first stage, a number of source textures, the associated vertex streams, the render targets, the vertex shader (VS), and the pixel shader (PS) are specified. The source textures hold the input data. The vertex streams comprise vertices that contain the target position and the associated texture address information. The render targets are textures that hold the resulting IDCT results.

The second stage is a rendering stage. The rendering is desirably triggered after a DrawPrimitives call, or other similar call, is issued. The vertex shader determines the target position and the texture address of each vertex involved in the specific primitive. Then the target textures are rasterized and the pixel shader is subsequently executed to perform per-pixel calculation.

Figure 5:
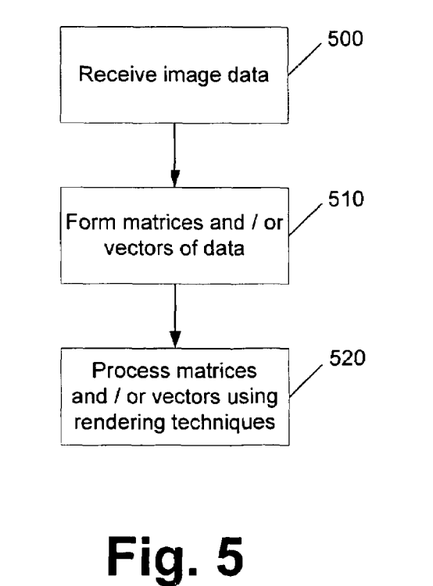
FIG. 5 is a flow diagram of an exemplary implementation of a transform on a GPU in accordance with the present invention.

FIG. 5 is a flow diagram of an exemplary implementation of a transform on a GPU in accordance with the present invention. At step 500, image data is received. Blocks of data (e.g., matrices and/or vectors of data) are generated, based on the image data, at step 510. The matrices and/or vectors of data are then processed at step 520 using one or more rendering modes or techniques, described further herein.

A GPU supports several rendering modes such as a point rendering mode, a line rendering mode, and a triangle (or quadrilateral) rendering mode. A quadrilateral is equivalent to two triangles.

Assume a transform kernel is 8×8, in which case a block size is typically also 8×8. A slice is a continuous span of blocks either horizontally or vertically (i.e., the width or height of a slice is equal to that of the frame while its height or width is the same as that of a block, e.g., 8 in this example). The point rendering mode means the target pixels are rendered one by one. The block rendering mode means the rendering is performed on a block by block basis, while the slice rendering mode means the rendering is performed on a slice by slice basis. The slice rendering mode is basically an extension or optimization of block rendering mode because a slice is a span of continuous blocks, which in turn uses a minimum of four vertices to specify.

Figure 6:
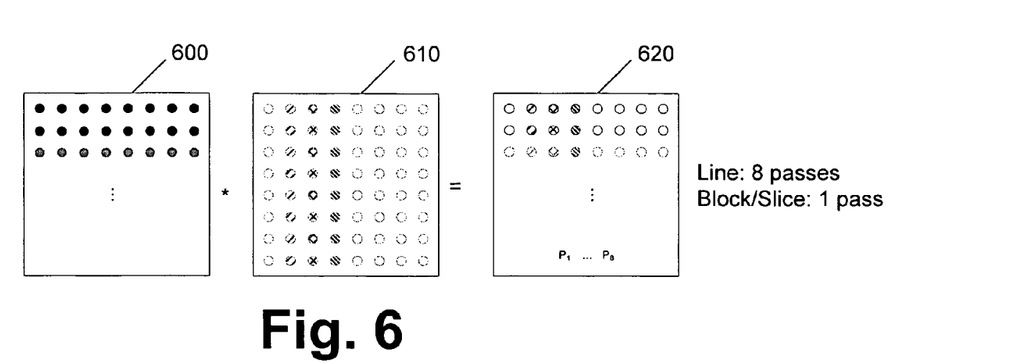
FIG. 6 is a diagram of the result of exemplary processes, line mode and block mode, useful in describing the present invention.

FIG. 6 shows that the same results are obtained using line mode or block/slice mode, but a different number of passes is used. A block of pixels 600 is processed using a transform matrix 610 to generate target data 620.

For line rendering mode, the columns (or rows) from the same position of all the blocks are rendered in one pass. For example, eight passes are used to achieve a complete 1D transform. The vertex shader for all the eight passes are the same while the pixel shaders are different only in constants which hold the transform kernel coefficients. The coefficients are distinct from target columns (or rows). A reason for adopting a line rendering mode is because a column (or row) of the target block uses the same transform kernel coefficients.

Regarding line mode multiplication (LMM), each pixel on the render target (i.e., a resulting pixel value after IDCT) is desirably obtained by performing the dot product of two corresponding vectors (one is the input DCT coefficient vector and the other is the IDCT transform kernel vector). Note that different target pixels correspond to different input vectors and IDCT transform kernel vectors. Because the IDCT transform kernel vectors are constant, they can be pre-calculated and stored into PS (pixel shader) constants. However, the PS constants desirably cannot be altered during a render pass. Therefore, it is beneficial to render a span (i.e., a row or a column, depending on the LeftX or RightX) of target pixels at a time so that the IDCT transform kernel vectors can be shared and the desirability of re-loading the PS constants is avoided. To achieve this, a line rendering mode is used which renders a line at a time for the target texture. This technique is referred to as line mode multiplication.

In the LeftX of LMM, for example, there are eight rendering passes with each pass rendering a row onto the target texture. The n-th pass renders the 8i+n-th row for all the blocks (i=0, 1, ..., H/8-1; H is the texture's height). The vertex shaders for the eight passes are the same while the pixel shaders are different in the constants. The RightX is similar to the LeftX except that now each pass renders W/8 (W is the texture's width) columns instead of H/8 rows. The vertex streams for the RightX and the LeftX are different.

Exemplary pseudo PS code below describes the n-th rendering pass of the LeftX. TexCoord[8] are calculated by the VS and stores eight vertical adjacent source texels' coordinates (e.g., a texel is to a texture as a pixel is to a picture).

```
LeftX_LMM{n} ( TexCoord[8] ) // n=0,1, ... ,7
{
    float color = 0
    for i = 0 to 7
        color += tex2D ( srcTex, TexCoord[i] ) * IDCTCoef[n][i]
    end for
    return color
}
```

For slice rendering mode, a difference from the line rendering mode is that the transform kernel matrix is now stored in a small (8×8) texture. One rendering pass is used to obtain the transform for a block (or, equivalently, for all the blocks in a frame because all the blocks are independent). As a result, the overhead of the rendering environment setup is reduced. Moreover, it can use a triangle (or quadrilateral) rendering mode which is more efficient than a line rendering mode because more pixels can be processed in parallel by the multiple internal graphics pipelines of the GPU. A penalty is that it increases the memory access because the transform kernel coefficients now are read during the rendering process while in the line rendering mode they are stored in pixel shader constants.

It is noted that the line rendering mode may not be as efficient as a triangle-based rendering mode due to the hardware design. To improve the efficiency, a slice mode multiplication (SMM) technique may be used which enables one pass rendering based on triangle-based rendering mode. For this purpose, the IDCT transform kernel matrix is stored in an 8×8 source texture, for example, for proper source texel and target pixel mapping.

Figure 8:
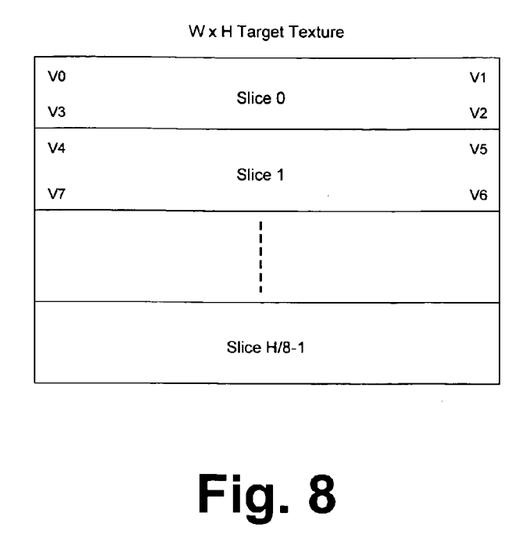
FIG. 8 is a diagram of an exemplary slice layout in accordance with the present invention.

In the LeftX of SMM, eight rows can be rendered in one rendering pass. These rows compose a W×8 (W-pixel wide and 8-pixel high) slice. Each slice is identified by four vertices. An exemplary slice layout is shown in FIG. 8. The RightX of SMM is similarly performed except that slices are now 8×H rectangles.

SMM may differ from LMM in at least the following aspects. For example, the matrix multiplication is accomplished in one rendering pass in SMM as compared with eight rendering passes in LMM. Moreover, fewer vertices are involved ((W+H)/2 in SMM versus 2(W+H) in LMM) in each rendering pass. These differences improve the efficiency of SMM because more pixels can be processed in parallel and the overhead of setups for rendering is reduced. Additionally, the IDCT transform kernel is stored in a texture in SMM, instead of being storied in PS constants as in LMM. However, this may result in a penalty in memory reads because the transform kernel is read during the rendering process.

Figure 7:
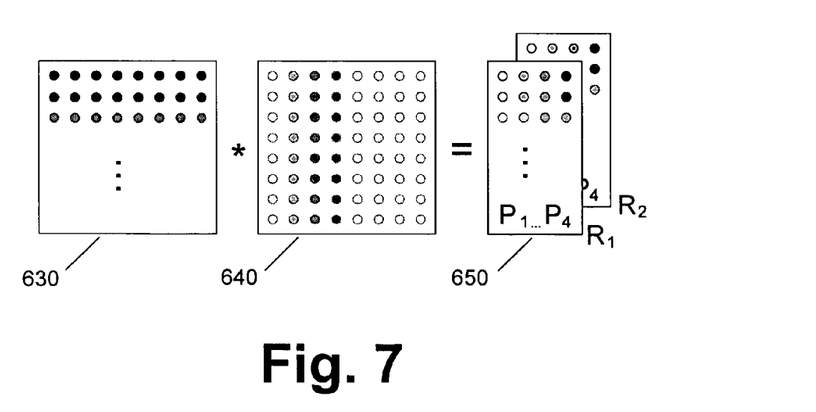
FIG. 7 is a diagram of the result of an exemplary process in which two render targets are used in accordance with the present invention.

Multiple render targets (MRT) may also be supported in a GPU. GPUs that are DirectX 9.0 (or above) typically support four render targets, with a minimum of two render targets. Multiple render targets means that the GPU can write to different render targets in a single rendering pass. MRT saves the GPU from memory access which may be a bottleneck when the arithmetic operations are relatively simple, as is the case in the block transform, for example. FIG. 7 illustrates the case where two render targets are adopted. A block of pixels 630 is processed using a transform matrix 640 to generate target data comprising two rendered targets 650.

An exemplary graphics engine has four parallel channels (e.g., red, green, blue, alpha). Therefore, four neighboring pixels can be packed into a 4-element vector and be processed by the graphics engine using its four channels simultaneously. This packing method for better utilization of the multi-channel capability of GPU is also called vectorization. For this technique, more powerful instructions such as dp4 can be utilized to save arithmetic instructions.

Figure 9:
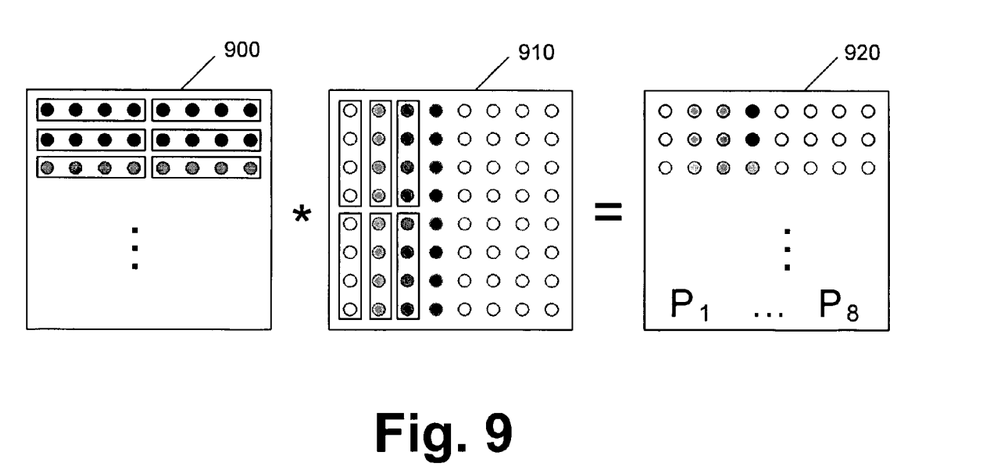
FIG. 9 is a diagram of useful in describing an example parallel process in accordance with the present invention.

In FIG. 9, the four texels in a block are packed into a vector. Note that this method utilizes the pixel level data parallelism of the input data. A block of pixels 900 is processed by packing several of them into a vector and transforming them using a transform matrix 910 to generate target data 920.

In other words, the internal graphics engine of GPU has four channels namely red, green blue, and alpha, that can work completely in parallel. A technique called multi-channel multiplication (MCM) utilizes the pixel level data parallelism. In MCM, the four neighboring pixels are "packed" into the four channels of a texel. Note that there is no need for the auxiliary packing and unpacking processes because the memory layout of a four-channel texel is the same as that of four one-channel texels. The memory access instructions are significantly reduced because a single memory read will fetch four input data values.

The LeftX of MCM is similar to that of LMM except that in MCM the operations are in a four-channel fashion (i.e., SIMD). Because of the "packing", a powerful instruction, dot, which performs dot production of two four-element vectors, can be used in the RightX. This saves the instruction count in the PS code which has a direct impact on the speed. Moreover, only two rendering passes are used for the RightX. Exemplary pseudo PS code below describes the RightX of MCM. TexCoord[2] stores the two horizontal adjacent source texels' coordinates.

```
RightX_MCM{n} ( TexCoord[2] ) // n=0,1
{
    float4 src, color
    src = tex2D ( srcTex, TexCoord[0] )
    color.r = dot (src, IDCTCoef[n][0] )
    color.g = dot (src, IDCTCoef[n][1] )
    color.b = dot (src, IDCTCoef[n][2] )
    color.a = dot (src, IDCTCoef[n][3] )
    src = tex2D (srcTex, TexCoord[1] )
    color.r += dot (src, IDCTCoef[n][4] )
    color.g += dot (src, IDCTCoef[n][5] )
    color.b += dot (src, IDCTCoef[n][6] )
    color.a += dot (src, IDCTCoef[n][7] )
    return color
}
```

The SMM and the MCM techniques can be combined to obtain an even more efficient technique. This combined technique may be referred to as slice mode multi-channel multiplication (SMMCM).

A single instruction multiple data (SIMD) property based on the multi-channel capability of a GPU may be also utilized in a way other than vectorization. Spatial data parallelism can be exploited by an SIMD property. For example, four blocks can be packed, and a DCT/IDCT can be performed for the four blocks simultaneously. In this case, each channel corresponds to a different block and the operations applied on the blocks are the same. Every operation on a texel actually processes the data from the four blocks simultaneously. However, a packing process is used for data preparation such that the data from four blocks are now packed into one block where all the four channels of a texel holds useful data. Similarly, after rendering, an unpacking process is used to restore the data from a packed representation.

Figure 10:
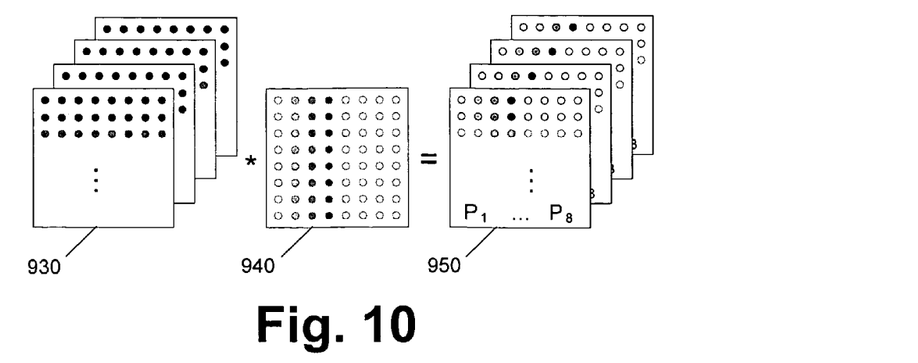
FIG. 10 is a diagram of useful in describing exemplary unpacking in accordance with the present invention.

FIG. 10 shows four blocks 930 being processed using a transform matrix 940 to generate four rendered targets 950, simultaneously.

As noted above, the capability of multiple render targets (MRT) of GPU may be used. For example, SM2.0 supports up to four rendering targets in a rendering pass. With MRT, if k (1<=k<=4) render targets are adopted, the pixel shader can render k pixels into the same position of the k target textures. This reduces the memory access by k times as compared with that of the single render target case (e.g., MCM). Moreover, MRT can be combined with MCM to yield a more efficient multi-channel and multiple render target multiplication (MC-MRTM).

Figure 11:
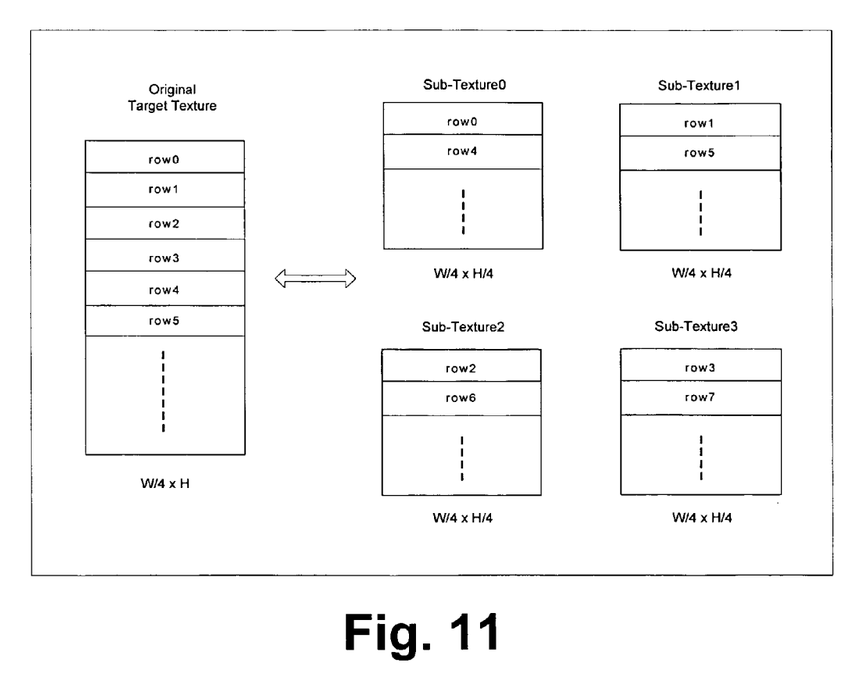
FIG. 11 is a flow diagram of an exemplary method of processing a target texture in accordance with the present invention.

In the LeftX of MCMRTM, the original target texture, whose size is W/4×H, for example, may be divided into four W/4×H/4 sub target textures, as shown in FIG. 11. Because four render targets are used, the number of reading operations is reduced to one-fourth of MCM. Because of the multi-channel technique, only two rendering passes are used to obtain the LeftX. An additional rendering pass that merges (by row interleaving) the four sub-textures to original target texture may be performed after the LeftX, using line rendering mode.

In the RightX of MCMRTM, keeping with the example, the original target texture is split into two sub-textures whose sizes are both W/8×H: sub-texture0 (t_sub0) stores all the even columns, and sub-texture1 (t_sub1) stores all the odd columns. Using two render targets, the number of reading operations is reduced by half. Due to the multi-channel technique, the RightX is achieved with a single rendering pass. An additional rendering pass is used to recover (by column interleaving) the original target texture from the two sub-textures. A merging method is desirably used that adopts an auxiliary mask texture (t_mask) so that the merging process can be achieved with a triangle-based rendering mode. The size of t_mask is W/4×1. Even indexed texels of t_mask have a value of zero and odd indexed texels have a value of one. When merging, the pixel shader calculates the output pixel according to the equation:

$$t\_out=(1-t\_mask)*t\_sub0+t\_mask*t\_sub1$$

where t_out is the target texture. Note that because the width of source textures are only half of that of the target texture, two neighboring target pixels will correspond to the same source texel because of the texture addressing mapping mechanism of GPU. The height of the mask texture is one which implies all the target pixels in the same column will have the same mask.

The slice rendering mode, multi-channel (with different methods to map the data parallelism to the multiple channels of the GPU's graphics engine) and multiple render target techniques may be used. Also, combinations of the techniques can be used (such as the SMMCM, MCMRTM, etc.). The application may choose the most suitable implementation(s).

Note that there are integer-based transform kernel designs for more efficient implementation in some applications. For example, it is possible to scale the DCT transform kernel to some integer and perform the intermediate operations in the integer domain and perform the desired reverse scaling at the end of the transform. This method is may be called integer implementation of DCT/IDCT transform.

An integer transform may be determined by searching for a kernel that approximates the DCT/IDCT characteristics well enough to replace DCT/IDCT for practical usage. There will be scaling operations involved throughout the implementation. Many modern image/video applications adopt an integer transform where the transform kernel consists of all integers. Although the internal computations of GPU are all float point, aspects of the invention may also be applicable to the integer transform kernel cases. Further, there is desirably no restriction on the input data format (e.g., signed, unsigned, integer, floating point, etc.). The input data can be integer (signed or unsigned) or float, for example. The application may choose the appropriate texture format for holding the input data.

It is noted that the 8×8 transform is only an example implementation. The techniques of the present invention can be applied to 4×4, 4×8, 8×16, 16×16 matrix sizes, for example, as well as other sizes. The proposed techniques can be applied to other block transforms as well.

The technique of using an auxiliary texture (mask texture) to merge (by interleaving, for example) intermediate textures may also be implemented. This method is very efficient when a line rendering mode is used and multiple rendering targets (MRT) is adopted.

Typical applications of the invention are described herein. One example is the fast rendering of a compressed image (e.g., JPEG compressed image). Conventionally, the CPU has to fully decode the compressed image (entropy decoding, inverse quantization, IDCT, and color space conversion) and send the bitmap data to the GPU for display. In accordance with aspects of the invention, the CPU only needs to partially decode the image (e.g., entropy decoding and inverse quantization) and send the intermediate data to the GPU. The GPU may perform the IDCT and color space conversion and display the image.

Another typical application is in video decoding applications. A typical CPU based video decoder may use entropy decoding, inverse quantization, IDCT, motion compensation, reconstruction (adding the motion compensated prediction and the IDCT'ed residue picture to reconstruct a new frame), and color space conversion. In accordance with the invention, the GPU can now further perform aspects of the IDCT. This helps to achieve better parallelism between the CPU and GPU.

The application may select the most suitable implementation of IDCT. For example, although SMMCM is slower than MCMRTM, it has a least two advantages when adopted in a practical video decoding system. In a video decoding process, there may exist many zero blocks. These blocks can be easily skipped using a conventional Z-buffer based culling method. SMMCM uses only one Z-buffer, while MCMRTM uses three Z-buffers. The overhead of setting up the Z-buffers may eat up the gain that MCMRTM has over the SMMCM. SMMCM also requires fewer memory resources, which becomes more important when decoding HD video. As a result, for image decoding applications, MCMRTM may be preferred while in video applications, SMMCM may be preferred.

For DCT/IDCT, although a solution has been described using both LeftX and RightX, it is contemplated to use LeftX (or RightX) at the cost of an additional transpose rendering pass.

Multi-channel is an efficient technique. Moreover, single-channel and multi-channel may both be used in example implementations. For example, the LeftX may use single channel while the RightX is uses multi-channel, and vice versa. The choice may be made according to the context into which the transform is to be applied.

By making use of the GPU's features such as parallel graphics pipelines, multi-channel capability, multiple render target etc., various techniques yield significantly faster speed than an optimized implementation on a CPU. A direct application of this is to perform IDCT on a GPU in a video decoding system such that the CPU and GPU can work effectively in a parallel fashion.

Exemplary Computing Environment

Figure 12:
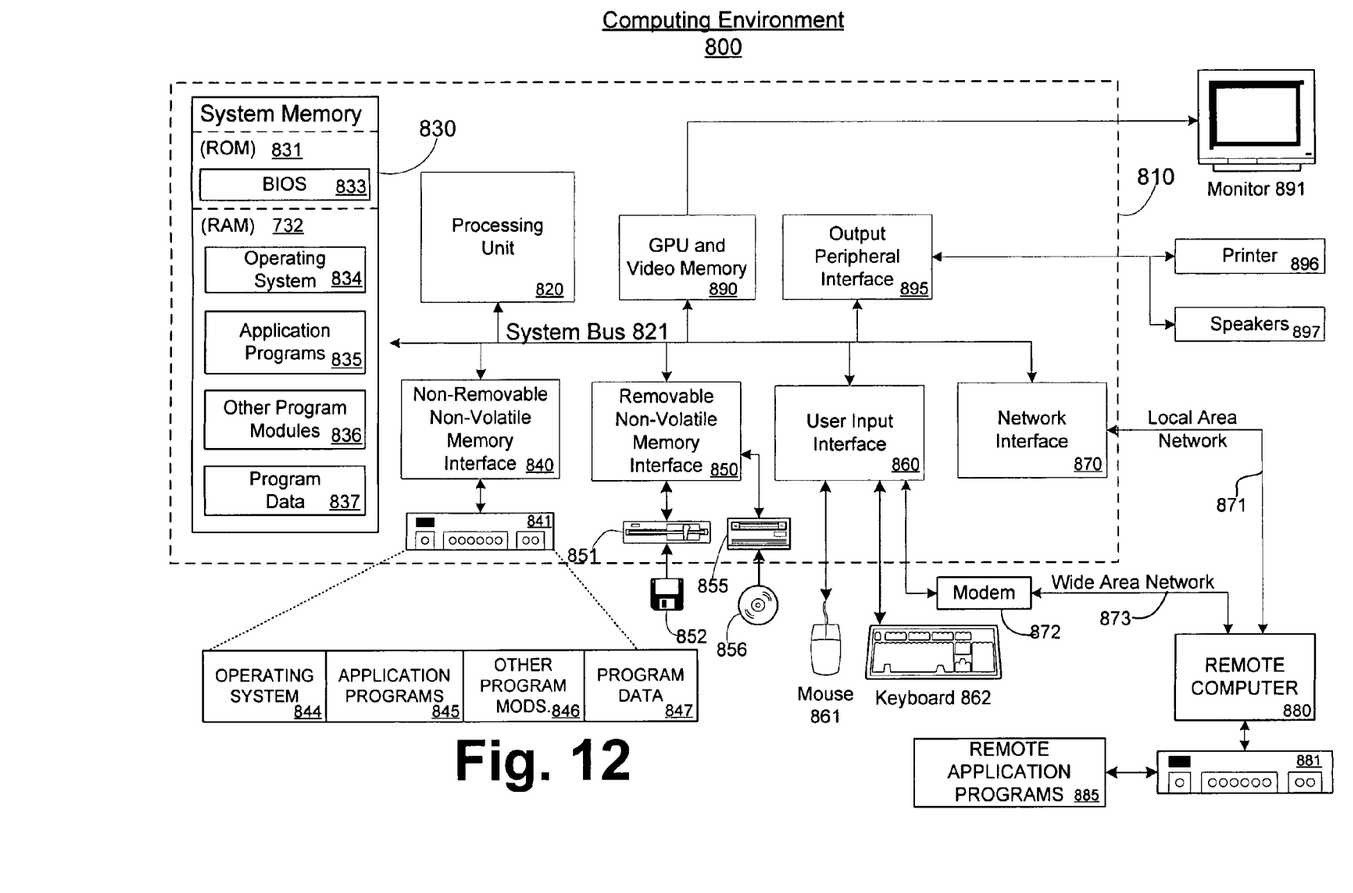
FIG. 12 is a block diagram showing an exemplary computing environment in which aspects of the invention may be implemented.

FIG. 12 illustrates an example of a suitable computing system environment 800 in which the invention may be implemented. The computing system environment 800 is only one example of a suitable computing environment and is not intended to suggest any limitation as to the scope of use or functionality of the invention. Neither should the computing environment 800 be interpreted as having any dependency or requirement relating to any one or combination of components illustrated in the exemplary operating environment 800.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 12, an exemplary system for implementing the invention includes a general purpose computing device in the form of a computer 810. Components of computer 810 may include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 810 typically includes a variety of computer readable media. Computer readable media can be any available media that can be accessed by computer 810 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 810. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or non-volatile memory such as ROM 831 and RAM 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 12 illustrates operating system 834, application programs 835, other program modules 836, and program data 837.

The computer 810 may also include other removable/non-removable, volatile/non-volatile computer storage media. By way of example only, FIG. 12 illustrates a hard disk drive 840 that reads from or writes to non-removable, non-volatile magnetic media, a magnetic disk drive 851 that reads from or writes to a removable, non-volatile magnetic disk 852, and an optical disk drive 855 that reads from or writes to a removable, non-volatile optical disk 856, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media provide storage of computer readable instructions, data structures, program modules and other data for the computer 810. In FIG. 12, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies. A user may enter commands and information into the computer 810 through input devices such as a keyboard 862 and pointing device 861, commonly referred to as a mouse, trackball or touch pad. Other input devices (not shown) may include a microphone, joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A monitor 891 or other type of display device is also connected to the system bus 821 via an interface, such as a video interface, which may comprise a graphics processing unit (GPU) and video memory 890. In addition to the monitor, computers may also include other peripheral output devices such as speakers 897 and printer 896, which may be connected through an output peripheral interface 895.

The computer 810 may operate in a networked environment using logical connections to one or more remote computers, such as a remote computer 880. The remote computer 880 may be a personal computer, a server, a router, a network PC, a peer device or other common network node, and typically includes many or all of the elements described above relative to the computer 810, although only a memory storage device 881 has been illustrated in FIG. 12. The logical connections depicted include a LAN 871 and a WAN 873, but may also include other networks. Such networking environments are commonplace in offices, enterprise-wide computer networks, intranets and the internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 12 illustrates remote application programs 885 as residing on memory device 881. It will be appreciated that the network connections shown are exemplary and other means of establishing a communications link between the computers may be used.

As mentioned above, while exemplary embodiments of the present invention have been described in connection with various computing devices, the underlying concepts may be applied to any computing device or system.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiments for performing the same function of the present invention without deviating therefrom. Therefore, the present invention should not be limited to any single embodiment, but rather should be construed in breadth and scope in accordance with the appended claims.

What is claimed is:

1. A method of accelerating operations on a computer system including a central processing unit (CPU) and a programmable graphics processing unit (GPU), the method comprising:
    forming blocks of data based on image data; and
    processing the blocks of data via the CPU and the programmable GPU, wherein processing the blocks of data includes:
        partially decoding the blocks of data via the CPU;
        using at least one rendering technique to implement a transform using matrix multiplication via the programmable GPU; and
        simultaneously processing each element of a multi-element vector representing multiple adjacent pixels using a corresponding parallel channel of the GPU.

2. The method of claim 1, wherein the transform is a discrete cosine transform or an inverse discrete cosine transform.

3. The method of claim 1, wherein the transform is a one dimensional transform.

4. The method of claim 1, wherein the transform is a two dimensional transform.

5. The method of claim 1, wherein the processing is at least one of a row and a column transform.

6. The method of claim 1, wherein the rendering technique comprises at least one of a point rendering mode, a line rendering mode, and a triangle rendering mode.

7. The method of claim 1, wherein the rendering technique comprises a slice rendering mode and the processing further includes a slice mode multiplication process.

8. The method of claim 1, wherein the processing further includes a multiple render target multiplication process wherein a pixel shader renders each of multiple pixels into a corresponding position of a target texture.

9. The method of claim 1, wherein the processing uses a parallel graphics pipeline of the programmable GPU.

10. A system adapted to receive image data, form blocks of data based on the image data, and process the blocks of data via a central processing unit (CPU) and a programmable GPU, wherein processing the blocks of data includes:

partially decoding the blocks of data via the CPU;

using at least one rendering technique to implement a transform using matrix multiplication via the programmable GPU; and     simultaneously processing each element of a multi-element vector representing multiple adjacent pixels using a corresponding parallel channel of the GPU.

11. The system of claim 10, wherein the rendering technique comprises at least one of a point rendering mode, a line rendering mode, and a triangle rendering mode.

12. The system of claim 10, wherein the rendering technique comprises a slice rendering mode and the processing further includes a slice mode multiplication process.

13. The system of claim 10, further comprising a parallel graphics pipeline used to process the blocks of data.

14. A system for implementing a transform on a programmable graphics processing unit (GPU), the system comprising:

means for receiving image data at the programmable GPU;

means for forming blocks of data based on the image data, wherein the blocks of data include at least one pixel; and     means for processing the blocks of data via a central processing unit (CPU) and the programmable GPU, wherein processing the blocks of data includes:

partially decoding the blocks of data via the CPU;

using at least one rendering technique to implement a transform via the programmable GPU, wherein the programmable GPU implements the transform using matrix multiplication;

simultaneously processing each element of a multi-element vector representing multiple adjacent pixels using a corresponding parallel channel of the GPU; and         rendering, using a pixel shader, each of multiple pixels into a corresponding position of a target texture using a multiple render target multiplication process.

15. The system of claim 14, wherein the means for processing comprises a parallel graphics pipeline of the programmable GPU.

16. The method of claim 1, wherein said partially decoding the blocks of data via the CPU includes performing at least one of entropy decoding or inverse quantization on the blocks of data.

17. A method of accelerating operations on a computer system including a central processing unit (CPU) and a programmable graphics processing unit (GPU), the method comprising:

receiving image data at the CPU;

forming blocks of data based on the image data; and processing the blocks of data via the CPU and the programmable GPU, wherein processing the blocks of data includes:

partially decoding the blocks of data via the CPU;

using at least one rendering technique to implement a transform via the programmable GPU, wherein the programmable GPU implements the transform using matrix multiplication;

simultaneously processing each element of a multi-element vector representing multiple adjacent pixels using a corresponding parallel channel of the GPU; and     storing a kernel of the transform in a texture using a slice mode multiplication process.

\* \* \* \* \*